May 12, 1970 G. VON DEN STEINEN 3,510,896
THREAD CUTTING MACHINE

Filed May 6, 1968 3 Sheets-Sheet 1

INVENTOR
Günter von den Steinen

BY *Spencer & Kaye*
ATTORNEYS

INVENTOR
Günter von den Steinen
BY Spencer & Kaye
ATTORNEYS

United States Patent Office 3,510,896
Patented May 12, 1970

3,510,896
THREAD CUTTING MACHINE
Günter von den Steinen, Hagen, Germany, assignor to Nutap Schuhl & Von den Steinen, Hagen, Germany
Filed May 6, 1968, Ser. No. 726,947
Claims priority, application Germany, May 18, 1967,
N 30,528
Int. Cl. B23g 1/00; 11/00
U.S. Cl. 10—129                    4 Claims

ABSTRACT OF THE DISCLOSURE

An improvement in thread cutting machines of the type having a rotatably mounted elongated screw tap, with a front portion onto which workpieces may be introduced and a bent rear portion from which workpieces may be discharged, and a workpiece collecting housing arranged around the rear portion of the screw tap. The improvement includes a resilient ring arranged within the housing and around the rear portion of the screw tap. The ring is constructed with a conical inner surface which flares outward in a direction away from the rear of the screw tap.

BACKGROUND OF THE INVENTION

The present invention relates to an improvement in a thread cutting machine for tapping nuts and similar mass produced parts. More particularly, the present invention relates to a thread cutting machine of the type wherein the parts to be tapped are held to prevent them from turning and pushed over a revolving screw tap. When the workpieces reach the rearward end of the screw tap, which is bent over to engage a drive mechanism, they are thrown outward by centrifugal force against a collecting housing.

The type of thread cutting machine just described operates, in general, at a cutting speed of approximately 20 to 25 meters per minute. It has been shown, however, that the screw tap of such a machine is capable of operating at cutting speeds which are several times higher than this normal cutting speed. But if the cutting speed is increased by increasing the rotational speed of the screw tap, the centrifugal force and, in turn, the speed with which the tapped nuts are swung away from the bent-over screw tap end is also increased. Experience has shown that when the nuts then impinge upon the collecting housing, both they and the housing are caused to deform. In addition, this increase in speed in which the nuts hit the inside of the collecting housing considerably increases the noise that is generated by the machine.

To avoid these difficulties, one thread cutting machine that is known in the prior art has been constructed with the rearward end of the screw tap, which releases the nuts, not bent-over but arranged to run coaxially with the thread cutting portion of the screw tap. This arrangement makes it necessary, however, to provide the screw tap with a crank-like offset at some distance from its rearward end to permit it to engage the screw tap drive. This requires complicated, costly and less reliable apparatus, such as worm gear drives, to transport the nuts across the length of the screw tap and, in particular, its offset.

It is also known to provide thread cutting machines, of the type that have the bent-over end on the screw tap, with a spring action device that restrains each nut at the point where it leaves the bent-over end. The springs of the restraining device are adjusted so that the centrifugal force of the nut will be just sufficient to overcome the restraint when the machine is in operation, and so that the nuts are prevented from falling off the screw tap when the machine is either idling or switched off. These precautions in no way reduce the danger of damage to the nuts which are flung from the screw tap, however, because the restrained nuts are again exposed, before they are thrown, to the rotational speed of the screw tap in the region of the bent-over screw tap end. This rotational speed therefore necessarily results in a corresponding speed of the thrown nut.

In addition, such a restraint of the nuts on the screw tapping shaft places a force against the nuts that are being tapped and can result in a deformation of at least the last thread of each nut. This is due to the increased axial force against each nut as it passes over the last threads of the cutting portion of the screw tap.

SUMMARY OF THE INVENTION

An object of the present invention, therefore, is to provide a thread cutting machine for nuts or the like, with a revolving screw tap designed to operate at high cutting speed, which retains the advantages of known machines of this type but which does not admit of their disadvantages.

More particularly, it is an object of the present invention to provide a thread cutting machine for nuts or similar mass produced parts which holds the workpieces to prevent them from turning, passes them over a revolving screw tap that ultimately throws them with centrifugal force against a collecting housing from a bent-over rearward end and which engages the rearward end and drives the screw tap at higher rotational speed than heretofore possible.

This, as well as other objects, which will become apparent in the discussion that follows, is achieved according to the present invention by surrounding the bent-over end of the screw tap with an elastomeric ring having a conical inner surface that flares outward in a direction away from the tap. When the nuts which are thrown out by centrifugal force from the end of the tap impinge upon the inner surface of the ring, they are then slowed and deflected away from the tap. The ring, according to the present invention, thus prevents the nuts from being damaged and prevents them from rebounding against the end of the screw tap and/or the screw tap guide.

According to a preferred embodiment of the present invention, the circular, elastic ring is rigidly mounted concentrically with the screw tap axis. In addition, the side of the ring which faces the screw tap end and flares conically backward with respect to the screw tap is provided a conical angle that is less than 60°.

It is especially advantageous if the material from which the ring, according to the present invention, is formed exhibits a Shore hardness of 90 units.

According to another preferred embodiment of the present invention, the ring is provided with a trough which opens inward in the region of its front face side ahead of the plane of rotation of the bent-over screw tap end. The ring is also provided with a channel which is directed vertically downward and opens into a drain outlet in the collecting housing.

According to a still further preferred embodiment of the present invention, the ring is provided with a rigid support, preferably in the form of a rim, at a location some distance from its conical inner side. The ring may be attached ot the rigid support by a plurality of screws preferably uniformly distributed around the ring circumference and arranged parallel to the axis of the screw tap. These screws advantageously terminate flush with the rear face side of the ring. The rim may then also be fastened by a plurality of rigidily held screws distributed around its circumference and displaced with respect to the screws which hold the ring. The rim screws are also preferably arranged to run parallel to the axis of the screw tap.

In a modification of the embodiment of the present invention described above, the rigid support is embedded in the ring.

According to still another preferred embodiment of the present invention, the collecting housing is made of an elastomeric material having high damping characteristics and the ring is made an integral part thereof.

According to a still further preferred embodiment of the present invention, the collecting housing is provided with an outlet for the nuts as an integral part thereof. The collecting housing is also preferably provided with a back wall that is detachable from the housing body. The back wall may advantageously include a conical casing which flares outward toward the rear and extends inward to the drive member that engages the bent-over end of the screw tap. The inside of the back wall at the point where the conical casing is joined thereto is preferably rounded to provide a smooth sliding surface for the workpieces.

DESCRIPTION OF THE PREFERRED EMBODIMENT

Figure 1:
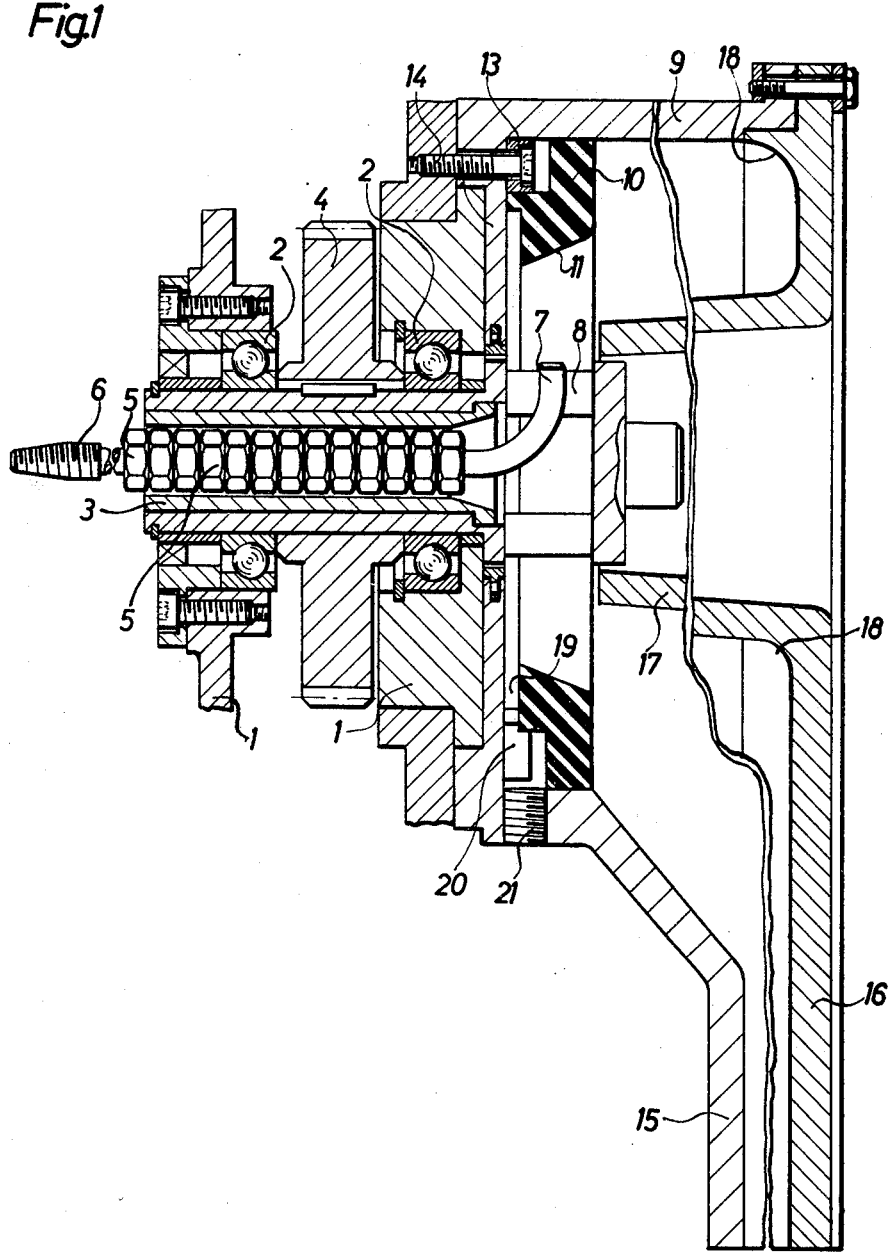
FIG. 1 is a cross-sectional elevational view of a portion of a machine, according to a preferred embodiment of the present invention, for cutting threads in nuts. The section is taken along a line 1—1 shown in FIGURE 2.
Figure 2:
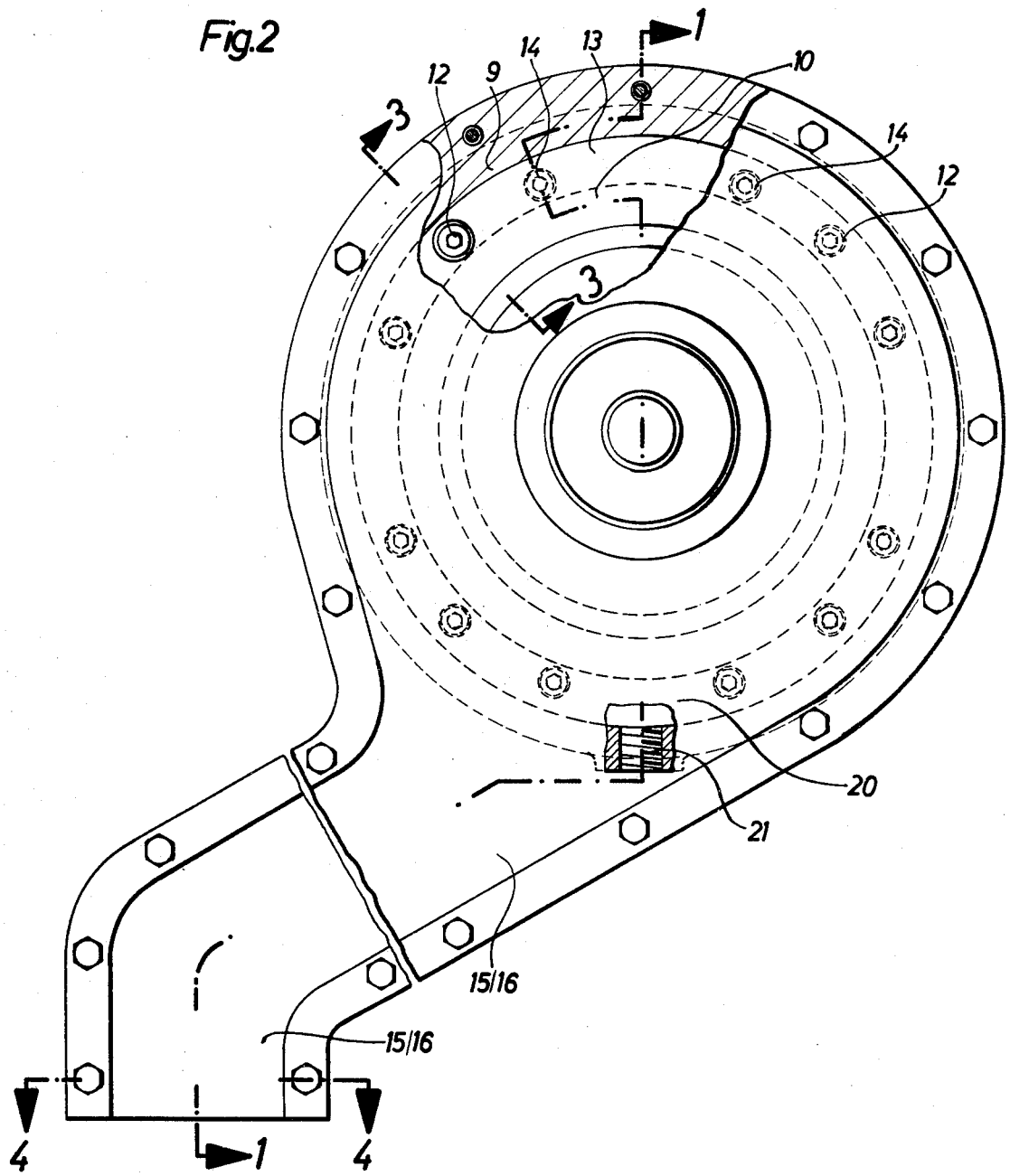
FIG. 2 is a partially cut-away elevational view of the backside of the thread cutting machine of FIG. 1.
Figure 3:
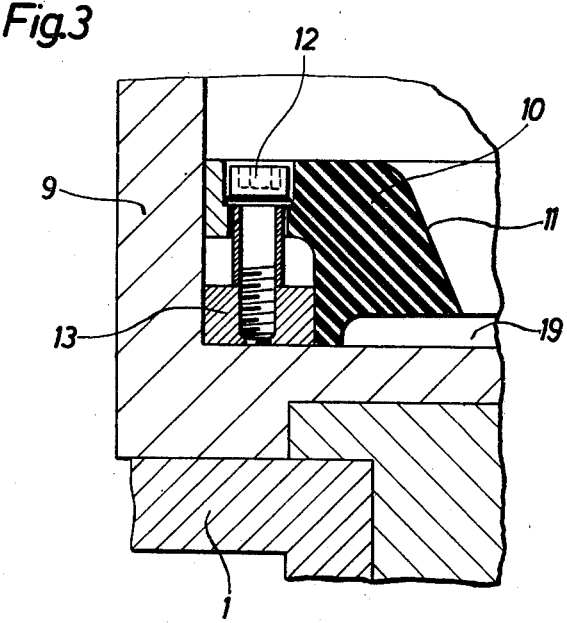
FIG. 3 is a sectional view of a detail of the thread cutting machine of FIG. 1 taken along the line 3—3 of FIG. 2.
Figure 4:
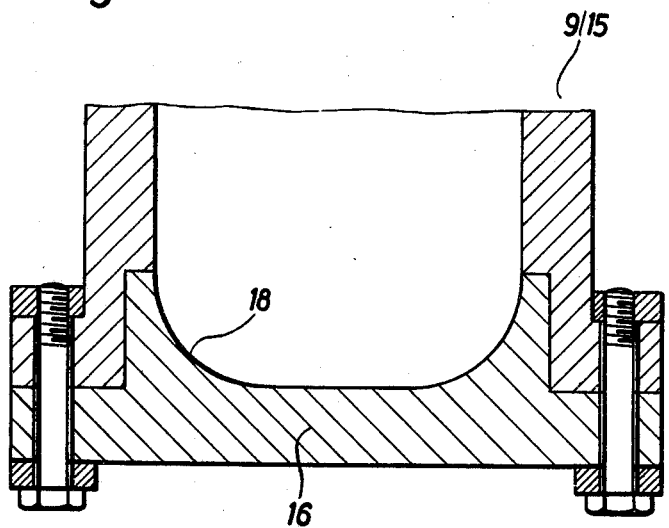
FIG. 4 is a sectional view of a detail of the thread cutting machine of FIG. 1 taken along the line 4—4 of FIG. 2.

Referring now to the drawing, FIGS. 1, 2, 3 and 4 each illustrate a different view of the preferred embodiment of the thread cutting machine according to the present invention. These figures, taken together, show a frame 1 which rotatably supports a workpiece guide 3 with the aid of the ball bearings 2. The workpiece guide is caused to rotate by a gear wheel 4. The guide is provided with nuts 5 which act as bearings for the shaft of the screw tap 6. The nuts 5 are initially held in a manner which prevents them from rotating and pushed over the rotating tap 6 by sliding or feeding member, not shown. As the nuts pass over the tap, they are provided with internal threads.

The rearward end 7 of the screw tap 6 is bent-over and engages in a substantially radially extending opening 8 in the workpiece guide 3, the latter being elongated in the rearward direction. The end 7 of the tap 6 is caused to rotate, therefore, by the contact with the guide 3.

The nuts 5 are pressed toward the end 7 of the shaft by the nuts that are subsequently threaded. These are finally accelerated outward away from the end 7 in the manner known in the art.

A collecting housing 9 is also attached to the frame 1. In this housing, and, in particular, in the plane of rotation of the tap end 7 is arranged a ring 10. This ring is made of elastomeric, e.g. rubber or rubber-like, material and is provided with a conical inner face 11 with flares outward toward the rear. It is especially advantageous if the ring 10 be made of the material which exhibits a Shore hardness of 90.

The ring 10 is attached by means of four screws 12 with hexagonal recessed holes to a rigid rim 13 made of steel. The rim is fastened, in turn, with eight screws 14 with hexagonal recessed holes to the frame 1.

The nut collecting housing 9 is provided with a curved outlet 15 for the nuts 5 that are thrown out from the screw tap. A detachable back wall 16 is also fastened to the housing body 9. This back wall is provided with a sleeve 17 which flares conically outward toward the rear of the machine and serves as an opening for the assembly of the tap 6. The internal edges 18 of the back wall 16 are rounded to provide a smooth passageway for the nuts.

When the nuts 5, which are thrown from the bent-over end 7 of the screw tap 6, impinge on the ring 10, their kinetic energy is transformed into energy of deformation, or heat. The speed of the nuts is thus reduced to an extent which eliminates the possibility of damage. The nuts are also simultaneously deflected from their original direction of motion toward the rear of the thread cutting machine. This has the effect of further reducing the inherent kinetic energy of the nuts and preventing them from rebounding back against the tap end 7. A reduction in the speed of the nuts is additionally achieved as a result of friction between the nuts and the ring 10. After the nuts have been thrown out from the tap end 7, their edge which faces the front of the machine first comes into contact with the inner side 11 of the ring 10. The nuts then tip over in such a way that they lie flat against the surface 11. Instead, therefore, of bouncing directly off the ring 10, the nuts slide toward the rear of the surface 11 using part of their kinetic energy to generate the heat of friction.

To prevent the cutting oil or some other similar fluid from reaching the inner face 11 of the ring 10 and thereby reducing its friction, the ring is provided with a trough 19 and a channel 20 which empties into a drain opening 21 in the collecting housing 9. These precautionary measures insure that the cutting oil will be diverted away from the inner face 11 of the ring and flow out through the drain 21.

It will be understood that the above description of the present invention is susceptible to various modifications, changes and adaptations, and the same are intended to be comprehended within the meaning and range of equivalents of the appended claims.

I claim.

1. A thread cutting machine comprising, in combination:
   (a) rotatably mounted elongated screw tap means having a front portion onto which workpieces may be introduced and a rear portion from which workpieces may be discharged, said rear portion extending at an angle with respect to the remainder of said tap means;
   (b) workpiece collecting housing means arranged around said rear portion; and
   (c) resilient ring means arranged within said housing and around said rear portion, said ring means having a conical inner surface which flares outward in a direction away from said tap means.

2. The thread cutting machine defined in claim 1, wherein said conical inner surface of said ring means forms an angle of less than 60° with respect to the axis of said ring means.

3. The thread cutting machine defined in claim 1, wherein said ring means has a Shore hardness of 90.

4. The thread cutting machine defined in claim 1, wherein said ring means includes a rigid rim which is fastened to said housing by means of screws.

References Cited

UNITED STATES PATENTS

| 1,719,568 | 7/1929 | Spies | 10—129 |
| 1,760,702 | 5/1930 | Kosfeld | 10—129 |

FOREIGN PATENTS

| 246,754 | 2/1926 | Great Britain. |
| 339,567 | 12/1930 | Great Britain. |
| 666,289 | 10/1938 | Germany. |

CHARLES W. LANHAM, Primary Examiner

E. M. COMBS, Assistant Examiner